Aug. 30, 1966     G. E. MERRILL     3,269,920
APPARATUS FOR PRODUCING POTABLE WATER FROM SALINE WATER
Filed April 15, 1963
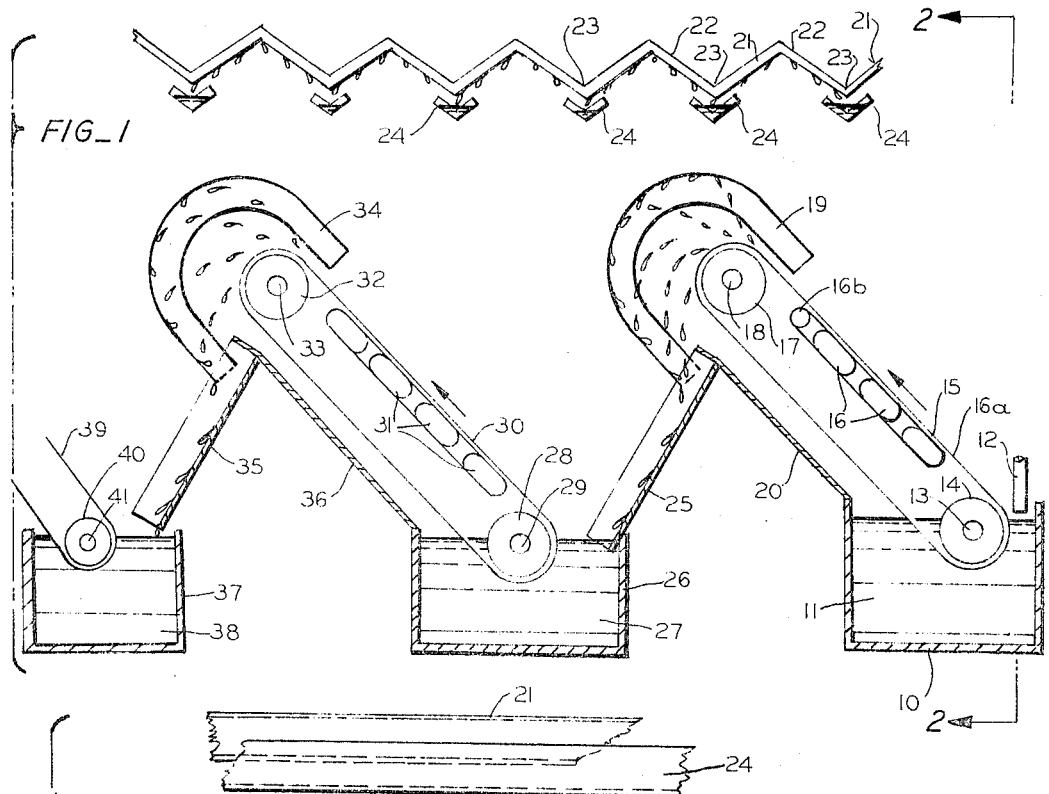
FIG_1
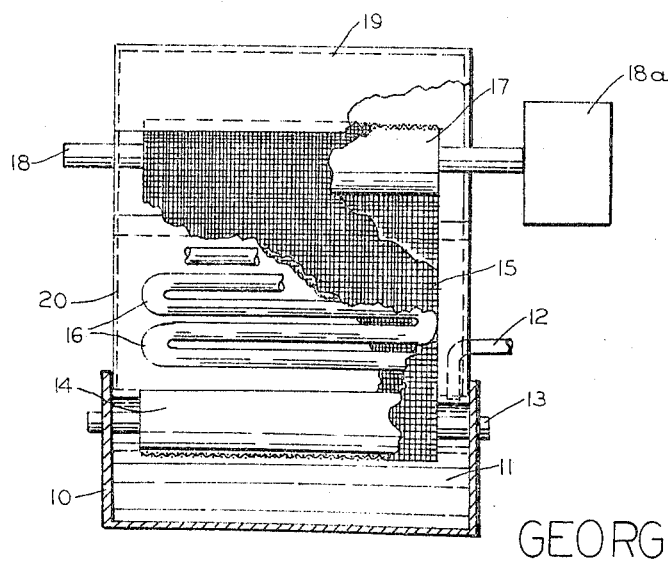
FIG_2
GEORGE E. MERRILL
*INVENTOR.*
BY *Allen and Chromy*
ATTORNEYS United States Patent Office 3,269,920
Patented August 30, 1966

3,269,920
APPARATUS FOR PRODUCING POTABLE
WATER FROM SALINE WATER
George E. Merrill, 5616 Croydon Ave.,
San Jose 24, Calif.
Filed Apr. 15, 1963, Ser. No. 272,968
3 Claims. (Cl. 202—173)

This invention relates to an apparatus for conveying and heating saline water to obtain potable water therefrom.

An object of this invention is to provide an improved apparatus for heating saline water in which the saline water is passed in the form of a thin web over the heating elements.

Another object of this invention is to provide an improved apparatus for producing potable water out of saline water in which the saline water is picked up by a perforated of foraminous conveyor and moved over heating elements so that some of the water thus conveyed is evaporated and the condensate is collected and used where potable water is required.

Other and further objects of this invention will be apparent to those skilled in the art to which it relates from the following specification, claims and drawing in which, briefly:

FIG. 1 is a side view of two stages of this multiple stage potable water producing apparatus; and FIG. 2 is a sectional view taken along the line 2—2 of FIG. 1.

Referring to the drawing in detail, reference numeral 10 designates a tank into which saline water 11 is supplied through the supply pipe 12. The supply pipe 12 may be connected to suitable pumps (not shown) which pump ocean water that is fed through the pipe 12 into the tank 10. A shaft 13 which is journaled in the sides of the tank 10 is provided for rotatably supporting the roller 14, and the lower end of the foraminous conveyor 15 in the saline solution 11. This conveyor may be made of suitable plastic, cloth, rubber or metal screen or other perforated or foraminous material that is serviceable in the heating temperatures used in this apparatus. The conveyor 15 passes around the upper roller 17 which is supported by the axle 18. Axle 18 is connected to the electric motor 18a which rotates the axle and roller 17, thus causing the conveyor 15 to move around the rollers 14 and 17.

The heating apparatus used comprises a serpentine arrangement of heating pipes 16, which may be provided with super-heated steam, or which may be in the form of ceramic-encased electric heating conductors such as are provided to conventional electric heater apparatus. The heating elements 16 are positioned slightly below the top member of a conveyor 15. Thus as the conveyor 15 is moved in the direction indicated by the arrow drawn adjacent thereto, the lower part of the conveyor picks up some of the saline water from the tank 10.

Inasmuch as the conveyor 15 is perforated or of foraminous or screen material, as indicated in FIG. 2, it picks up the saline water from the tank 10 in the apertures or interstices thereof, and as the conveyor is moved over the heating elements 16, some of this conveyed water is heated and vaporized. The water vapor rises to the ceiling of this apparatus which is made up of inclined board members 21 and 22 which are preferably of metallic material or other material that is a good heat conductor. The upper surface of this roof is cooled by circulating air thereover, or by other cooling means (not shown), and as a result the water vapor striking the bottom surface of this roof condenses and flows down the inclined board members to the lowermost points 23 thereof. These lowermost points are positioned over the troughs 24 which collect the water dropping off of the lower-most points 23, and this collected water is fed to a suitable collector tank (not shown). The collecting troughs 24 are preferably positioned well below the condensing boards.

The saline water remaining on the conveyor 15 after the conveyor passes over the heating element 16 is largely thrown off by centrifugal action as the conveyor passes around the roller 17, and most of this water jettisoned from the conveyor 15 is collected by the hood 19 and flows therefrom to the trough 25 into the next supply tank 26 of the next water vaporizing stage. A panel 20 is provided below the conveyor 15 for guiding any water dropping thereto into the tank 10.

The water carried by the trough 25 to tank 10 forms the supply 27 into which the lower end of conveyor 30 of the second stage of this apparatus is immersed. This conveyor passes around the roller 28 which is supported in the tank 26 by the shaft 29. As the lower end of the conveyor 30 is passed through the saline water supply 27 in tank 26, it collects some of the water in the apertures or interstices thereof in the same way a conveyor 15 collects water from tank 10. Inasmuch as tank 26 will have a substantially higher concentration of saline material, the foraminous conveyor 30 must be made of a coarser design, that is, the apertures thereof will be larger than the apertures in the conveyor 15.

Conveyor 30 passes over the heating elements 31 which are similar to the previously described heating elements 16. As the conveyor 30 is moved in the direction indicated by the arrow, the water conveyed by conveyor 30 is heated by the heating elements 31 and some of the water thus conveyed is vaporized. This vapor rises to the roof made up of board elements 21 and 22 and the vapor is condensed on the lower surface thereof and the condensate is collected in the troughs 24 which lead to the collector tank, as previously described. Most of the water remaining on conveyor 30 after passing the heating elements 31 is jettisoned therefrom when the conveyor passes around the upper roller 32 which is supported by the shaft 33. This jettisoned water is collected in the hood 34 and fed to the trough 35 which guides it to the supply tank 37 of the next stage. The panel 36 is also provide underneath conveyor 30 to guide any water dropping thereto to the tank 26. Another conveyor 39 is provided to this apparatus and the lower end of this conveyor is immersed in the solution 38 in tank 37. A roller 40, which is supported by the shaft 41, is provided to tank 37 for guiding the conveyor through the solution in this tank.

A motor similar to motor 18a is provided for driving the shaft 33 and roller 32. A similar motor is provided for driving the conveyor belt 39 over an upper roller (not shown). Several additional stages, each employing a conveyor such as conveyors 15, 30 and 39, the bottom ends of which are immersed in suitable supply tanks, may be provided in addition to the stages illustrated in FIG. 1 with the result that the water jettisoned from the last stage conveyor represents a very highly concentrated saline solution from which the water may be extracted simply by allowing it to evaporate in large tanks, and the vapor collected on roofs such as shown in FIG. 1. Also in the final stages of this apparatus, suitable brushes which are rotatable may be positioned underneath the upper rollers and underneath the upper part of the conveyor whereby any salt adhering to the conveyor after it rounds the upper roller is brushed free of the conveyor. In such an installation the guide panel, such as the panel 36 shown in FIG. 1, leads to a separate tank and not to a tank such as 26 inasmuch as in such cases it is desirable to collect the salt scraped off of the conveyor into a separate tank.

While I have shown a preferred embodiment of the invention it will be understood that the invention is capable of variation and modification from the form shown so that its scope should be limited only by the scope of the claims appended thereto.

What I claim is:

1. In an apparatus for purifying saline water by distillation of saline distilland and recovering of distillate, the combination comprising a plurality of water vaporizing stages, each of said stages comprising a foraminated conveyor, roller means for supporting said conveyor in an inclined position so that the conveyor has an upper web moving upward and a lower web positioned below said upper web, means for driving said roller means for moving said conveyor so that said upper web moves in the upward direction, heating means positioned underneath said upper web, means for supplying saline water to the lower ends of the conveyor so that saline water is picked up in the foramina of the conveyor and moved over said heating means, some of said saline water being evaporated as the conveyor passes over said heating means, said driving means moving said conveyor at a speed such that some of the saline water remaining thereon after passing over said heating means is jettisoned at the upper end of said conveyor where the direction of motion of the conveyor is abruptly changed and means at the upper end of said conveyor for collecting said jettisoned saline water and passing it to the next one of said stages, and means positioned above said conveyor for condensing and collecting the vaporized water.

2. In an apparatus for purifying saline water by distillation of saline distilland and recovery of distillate, the combination comprising a series of vertically inclined coacting endless foraminated conveyors which are spaced horizontally, a series of tanks for containing said distilland, one of said tanks being disposed adjacent the lower end of each of said inclined endless conveyors and arranged so that the lower part of said conveyors picks up distilland from said tank and conveys a portion thereof upwardly, means disposed beneath each of said endless conveyors for receiving and returning distilland falling from said endless conveyor back to the tank therebeneath, heating means positioned beneath each of said endless conveyors for heating distilland carried upwardly by said conveyors to produce vapors of the same, hood means arranged above and around the upper end portion of each of said endless conveyors, a vertically inclined member communicating with said hood means disposed thereabove and extending downwardly terminating at the lower end in the next succeeding endless conveyor tank for collecting and feeding distilland jettisoned from the upper end of the conveyor into the hood and transferring the same into the next succeeding tank to supply distilland thereto, conduit means connected to the first of said series of tanks for supplying distilland thereto, and condenser means arranged over said series of endless conveyors for condensing said vapors and collecting the resultant distillate.

3. In an apparatus for purifying saline water by distillation of saline distilland and recovery of distillate, the combination as set forth in claim 2, further comprising means for driving said inclined endless conveyors so that the upper web thereof is moved upward and the lower web thereof is moved downward, the speed of the web of each conveyor being such that when it turns from upward motion to downward motion liquid thereon is jettisoned into said hood.

References Cited by the Examiner

UNITED STATES PATENTS

| | | | |
|---|---|---|---|
| 732,234 | 6/1903 | Sudre et al. | 202—64 X |
| 781,045 | 1/1905 | Brooks-Sewell. | |
| 2,150,684 | 3/1939 | Hickman | 202—64 X |
| 3,111,461 | 11/1963 | Hickman | 202—236 X |
| 3,170,852 | 2/1965 | Barnhart | 202—64 X |

NORMAN YUDKOFF, *Primary Examiner.*

F. E. DRUMMOND, *Assistant Examiner.*